US 8,295,161 B2

(12) United States Patent  (10) Patent No.: US 8,295,161 B2
Azumi et al.  (45) Date of Patent: Oct. 23, 2012

(54) NETWORK APPARATUS THAT DETERMINES WHETHER DATA IS WRITTEN INTO BUFFER BASED ON DETECTION OF A MEMORY ERROR

(75) Inventors: Ryoji Azumi, Kawasaki (JP); Takashi Umegaki, Kawasaki (JP); Shigeo Tani, Kawasaki (JP); Shosaku Yamasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 391 days.

(21) Appl. No.: 12/639,086

(22) Filed: Dec. 16, 2009

(65) Prior Publication Data

US 2010/0158514 A1    Jun. 24, 2010

(30) Foreign Application Priority Data

Dec. 24, 2008 (JP) .................................. 2008-328379

(51) Int. Cl.
H04L 1/22 (2006.01)
(52) U.S. Cl. ................ 370/218; 714/13; 398/2
(58) Field of Classification Search .......... 370/216–228; 398/1–8; 714/1–2, 4.11, 13; 709/208–211
See application file for complete search history.

(56) References Cited

U.S. PATENT DOCUMENTS

2005/0058079 A1* 3/2005 Utsunomiya et al. ......... 370/242
2007/0168584 A1 7/2007 Kamimura

FOREIGN PATENT DOCUMENTS

JP  2007-188428 A  7/2007
JP  4003620 B  11/2007

* cited by examiner

Primary Examiner — Kibrom T Hailu
Assistant Examiner — Benjamin Lamont
(74) Attorney, Agent, or Firm — Fujitsu Patent Center

(57) ABSTRACT

A network apparatus includes: an input interface unit; a first and second line switching units cross-connecting output signals from the input interface unit; an output interface unit including a selection unit selecting outputs from the first or second line switching units; and a CPU. The line switching units each include: a control signal generation unit storing setting data in a memory and generating a line switching control signal based on the setting data; a memory error detection processing unit detecting a memory error and outputting error information; and a main signal processing unit writing setting data into a buffer when an error is not detected, and holding setting data stored in the buffer when the error is detected, and which performs cross-connection processing according to the setting data stored in the buffer. The CPU controls the selection unit according to the error information.

4 Claims, 11 Drawing Sheets

NETWORK APPARATUS THAT DETERMINES WHETHER DATA IS WRITTEN INTO BUFFER BASED ON DETECTION OF A MEMORY ERROR

CROSS-REFERENCE TO RELATED APPLICATION(S)

This application is based upon and claims the benefit of priority of the prior Japanese Patent Application No. 2008-328379, filed on Dec. 24, 2008, the entire contents of which are incorporated herein by reference.

FIELD

The embodiments discussed herein are related to a network apparatus used for line switching in a synchronous optical network (SONET), a synchronous digital hierarchy (SDH), or the like.

BACKGROUND

FIG. 1 is a block diagram of an exemplary general related art network apparatus used for line switching. Referring to FIG. 1, a network apparatus 1 includes a plurality of input interface units 2, working and protection line switching units (STS-SWs: synchronous transport signal switches) 3W and 3P, a plurality of output interface units 4, and a central processing unit (CPU) 5.

The input interface units 2 receive optical transmission data in a format such as OC (optical carrier)-12/48/192/768 transmitted from another SONET network apparatus (not illustrated), and after conversion into electrical signals, transfer the transmission data to the line switching units 3W and 3P. The output interface units 4 convert transmission data transferred from the line switching units 3W and 3P into optical signals in a format such as OC-12/48/192/768, and transmit the transmission data to another SONET network apparatus (not illustrated).

In the line switching units 3W and 3P, data input from each channel (corresponding to STS-1, which is the smallest unit) of the input interface units 2 is subjected to cross-connection processing (switching processing) or the like which controls which channel of which interface unit 4 the data is to be output to, on the basis of the state of transmission lines and software-set information from the CPU 5, and is transferred to a predetermined channel of the interface units 4.

The line switching units 3W and 3P are respectively a working unit and a protection unit constituting a redundant system configuration (dual configuration). When a failure occurs in the working line switching unit 3W, the CPU 5 is notified of the occurrence of the failure. The CPU 5, receiving the failure occurrence notification, controls the output interface units 4 such that transmission signals to be selected are changed from those of the working line switching unit 3W over to those of the protection line switching unit 3P. The CPU 5 performs line setting for the line switching units 3W and 3P, line setting for the interface units 2 and 4, the monitoring of line states, and line changeover control. Note that the CPU 5 is also configured as a dual system in preparation for failures.

Recent rapid progress in the miniaturization of devices, such as field programmable gate arrays (FPGAs) or application specific integrated circuits (ASICs), has increasingly resulted in malfunctions due to bit inversion (soft errors) in memory devices caused by cosmic rays, such as a particles or neutrons. Hence, it has become important for an apparatus to have a configuration which prevents malfunctions caused by memory errors including such soft errors.

FIG. 2 is a detailed configuration diagram of line switching units of the related art network apparatus. Referring to FIG. 2, the working line switching unit 3W and the protection line switching unit 3P have the same configuration, and each include a control signal generation unit 31 and a main signal processing unit 32. The control signal generation unit 31 includes a memory 311, a control signal processing unit 312, and a memory error detection processing unit 313. The main signal processing unit 32 includes a cross-connection processing unit 321, which includes a buffer 322. The interface unit 4 is provided with a selector 41.

In the control signal generation unit 31, the memory 311 stores switching control information set by the CPU 5 and intermediate information, and the control signal processing unit 312 generates a line switching control signal on the basis of the information stored in the memory 311 by the CPU 5. When these kinds of information are stored in the memory 311, information (parity information) for error detection is added to and stored with the kinds of information. The memory error detection processing unit 313, when reading data, checks the read data and notifies the CPU 5 of error information upon detection of a memory error.

The information described above is stored in the buffer 322 from a line switching control signal received from the control signal processing unit 312 of the control signal generation unit 31. The main signal processing unit 32 performs line switching control based on this information, and outputs a main signal that has been subjected to line switching to the output interface units 4. The selector 41 of the interface unit 4 normally selects the output from the main signal processing unit 32 of the working line switching unit 3W, and transfers the output to a subsequent processing circuit.

The CPU 5, upon receipt of an error notification from the control signal generation unit 31 of the working line switching unit 3W, changes the output from the working line switching unit 3W over to the output from the protection line switching unit 3P, by controlling the selector 41 of the interface unit 4. Note that when the memory error is a soft error due to cosmic rays such as a particles or neutrons, recovery from the error is achieved by resetting the data of the memory 311 of the working line switching unit 3W. However, since it is difficult to discriminate such soft errors from permanent errors, changeover to the output from the protection line switching unit 3P is performed in either case. When recovery from the error of the working line switching unit 3W is achieved later under the monitoring of the CPU 5, whether the output of the working line switching unit 3W is selected at this time or at the occurrence of a new failure depends on the applications being used.

Related techniques are disclosed in Japanese Unexamined Patent Application Publication No. 2007-188428 and Japanese Patent No. 4003620.

SUMMARY

According to an aspect of the invention, a network apparatus includes: an input interface unit operable to receive and process a signal input from another apparatus; a first line switching unit and a second line switching unit operable to cross-connect output signals from the input interface unit on a frame-by-frame basis; an output interface unit which includes a selection unit operable to select either of outputs from the first and the second line switching units and which processes and outputs an output of the selection unit to another apparatus; and a CPU operable to control the selection unit. The line switching units each include: a control signal generation unit operable to store setting data from the CPU in a memory and generate a line switching control signal based on the setting data stored in the memory; a memory error detection processing unit operable to detect a memory error of the memory and output error information regarding the memory error; and a main signal processing unit which writes setting data indicated by the line switching control signal into a buffer when the error information does not indicate an error, and holds setting data stored in the buffer when the error information indicates an error, and which performs cross-connection processing based on the setting data stored in the buffer, wherein the CPU controls the selection unit based on the error information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

The existing related art network apparatuses, as described above, have dealt with the occurrence of incorrect settings due to memory errors. In this case, there exists a problem in that data may be transferred to a line different from the line to which the data is to be transferred, because information regarding line switching is held in an abnormal state (misconnection) for a short period of time, although only a few seconds if any, until changeover to the protection line switching unit 3P is completed.

Figure 3:
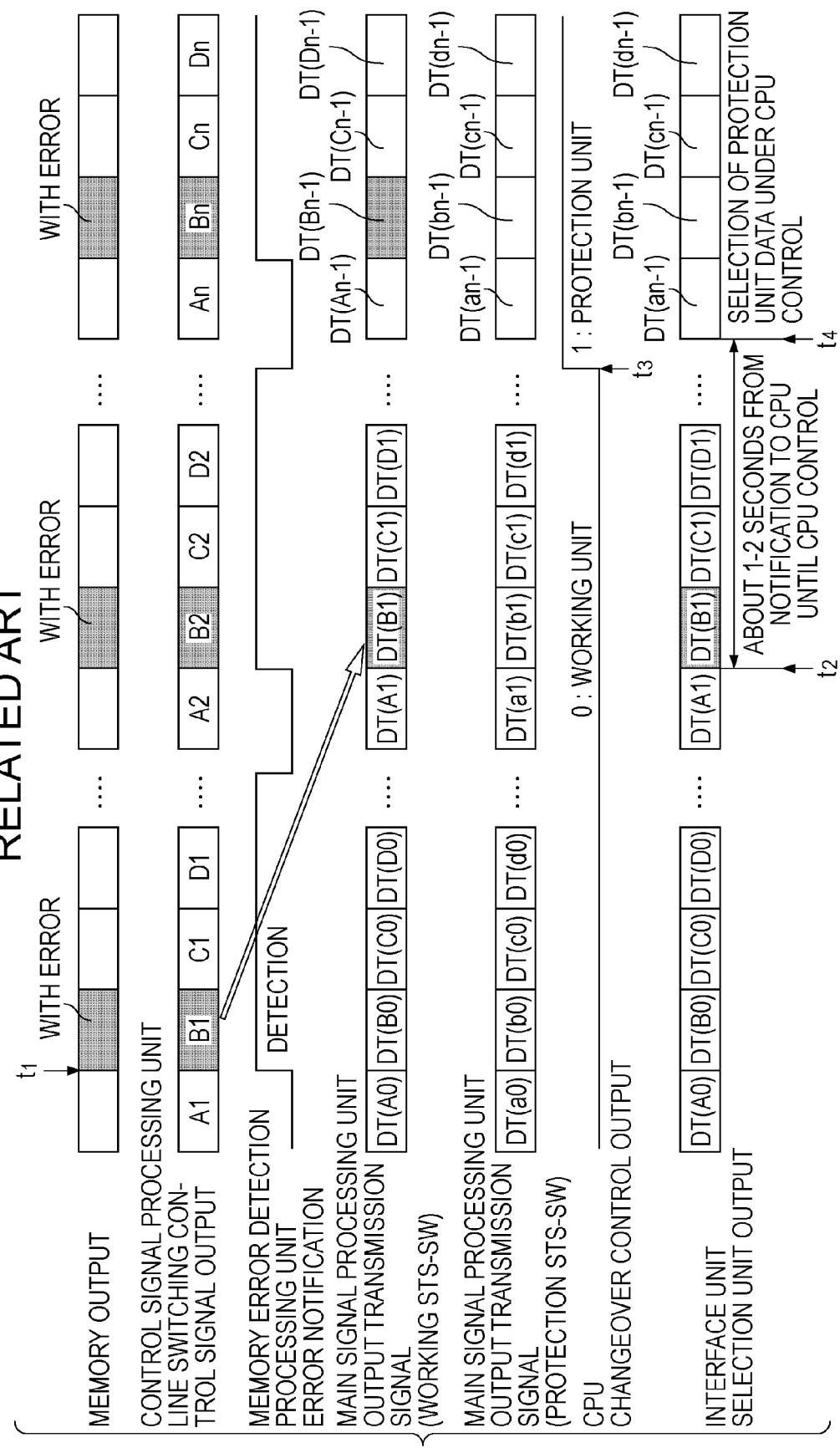
FIG. 3 is a time chart illustrating exemplary processing performed at the time of the occurrence of a memory error in the related art network apparatus.

FIG. 3 is a time chart illustrating exemplary processing of the related art performed at the time of the occurrence of a memory error. FIG. 3 illustrates the changes in the states of the following: the output of the memory 311, the line switching control signal output of the control signal processing unit 312, the error notification given by the memory error detection processing unit 313, the output transmission signal of the main signal processing unit 32 of the working line switching unit 3W, the output transmission signal of the main signal processing unit 32 of the protection line switching unit 3P, the changeover control output of the CPU 5, and the output of the selector 41 of the output interface unit 4.

Referring to FIG. 3, it is assumed that a memory error has occurred at time t1 in data in the memory 311 corresponding to the second channel of a frame. Then the memory error detection processing unit 313 notifies the CPU 5 of the occurrence of the error at almost the same time. The control signal processing unit 312 outputs a line switching control signal based on the data including the memory error. Note that the memory error is similarly detected in the subsequent frames, since the data in the memory 311 is not updated until a new value is set by the CPU 5.

Since the main signal processing unit 32, after having stored the line switching control signal from the control signal generation unit 31 in the buffer 322, performs processing one frame later, the CPU 5 starts control of changeover to the protection unit at time t2. At time t3, the CPU 5 transmits a changeover control output to the output interface units 4, whereby the interface unit 4 selects the output transmission signal of the protection line switching unit 3P after time t4.

Hence, during a time period of about one to two seconds required for the completion of changeover to the protection unit, the interface unit 4 selects and transmits, to a subsequent stage, transmission signals cross-connected based on a setting in an abnormal state caused by a memory error. This results in incorrect transmission of information of an unexpected different line.

Japanese Unexamined Patent Application Publication No. 2007-188428 discloses the following technique. That is, in transmission using a serial interface (between a storage device such as an HDD and a server) in a storage system, the detection result of a bus error or a memory error is stored in an externally accessible register. Based on the content of the register, an interrupt signal is transmitted to perform data control, thereby realizing increased performance (ensuring a desired transmission band).

Japanese Patent No. 4003620 discloses a technique that prevents an abnormal optical output by controlling the skew of an output signal pulse width at the time of detecting an error of a memory used for signal transmission.

These examples of the related art do not solve the above-described problems because they do not take into consideration the environment of a network apparatus used for line switching in SONET/SDH or the like.

First Embodiment

Figure 1:
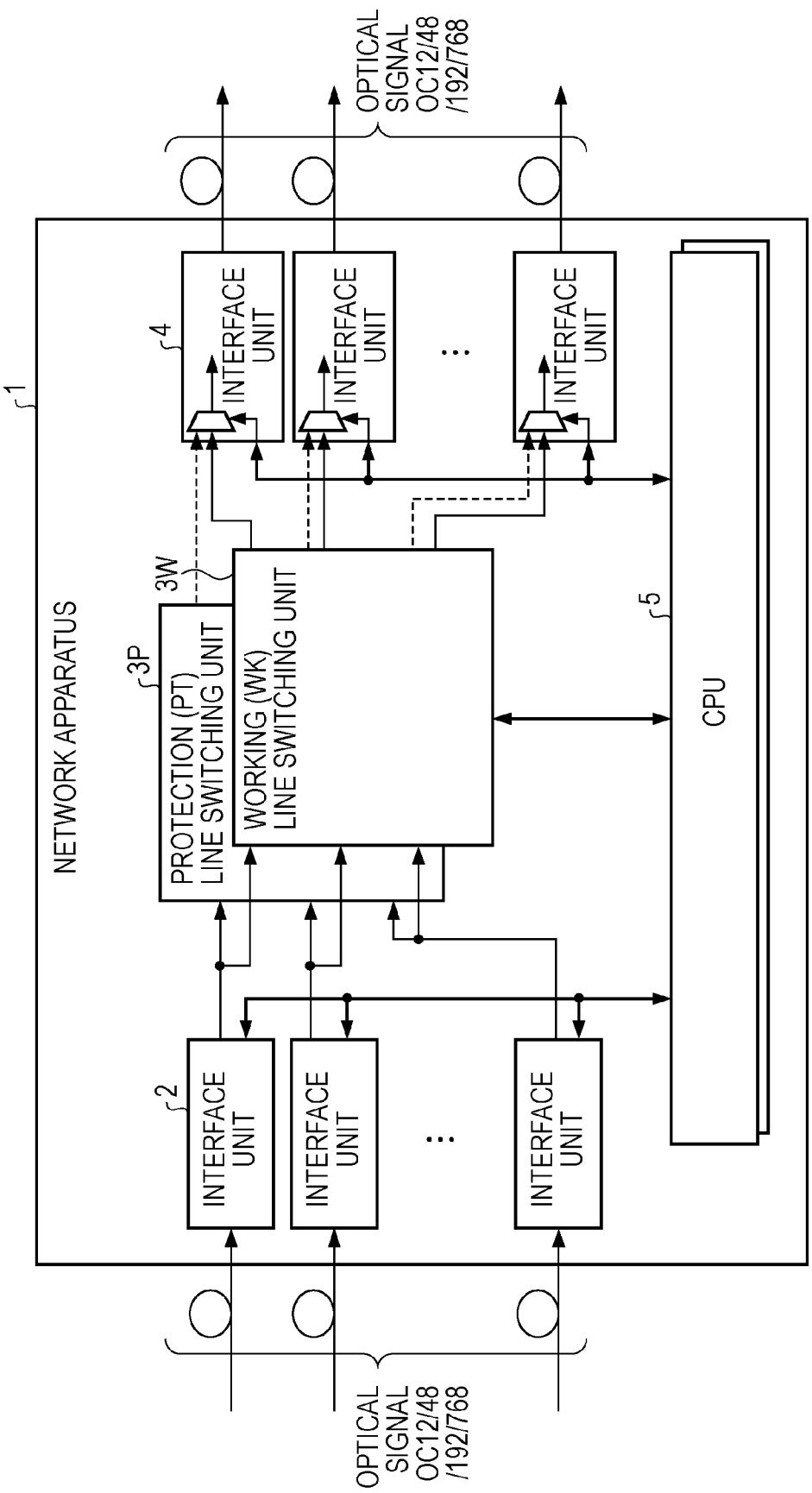
FIG. 1 is a block diagram of an exemplary general related art network apparatus used for line switching.
Figure 2:
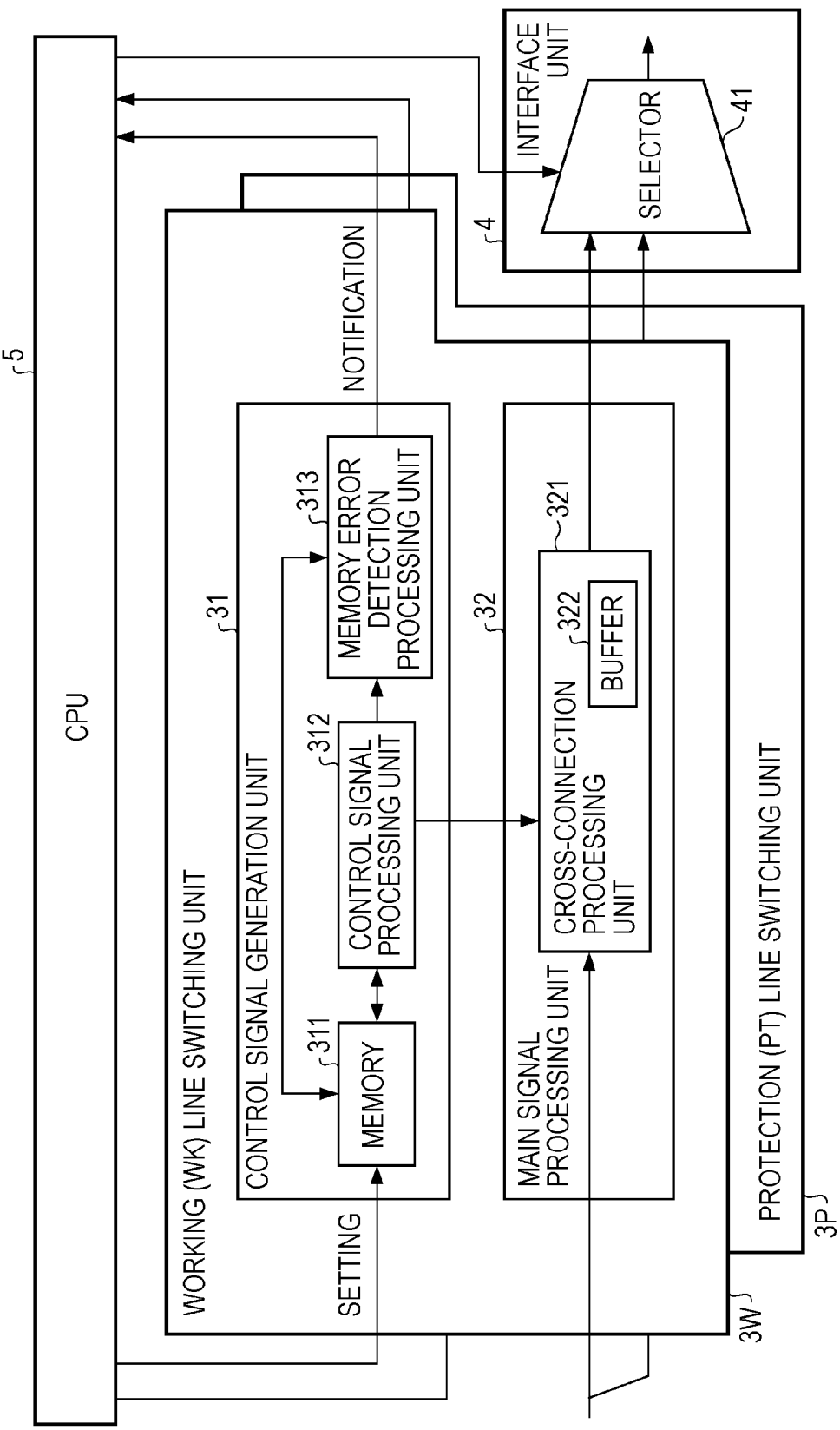
FIG. 2 is a detailed configuration diagram of line switching units of the related art network apparatus.
Figure 4:
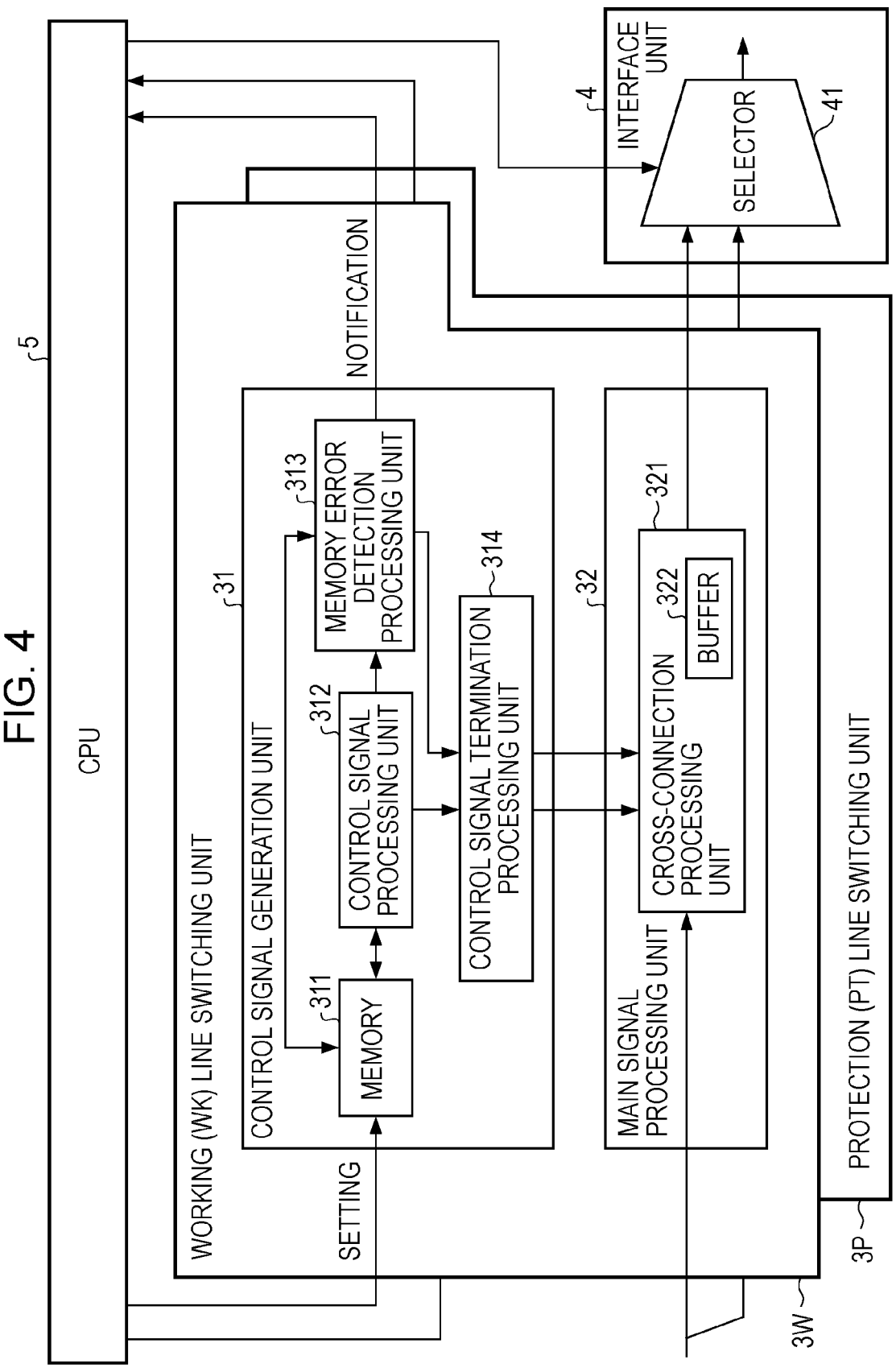
FIG. 4 is a block diagram of an exemplary configuration of a network apparatus according to a first embodiment.

FIG. 4 is a block diagram of an exemplary configuration of a network apparatus according to a first embodiment and illustrates the configurations of a working line switching unit 3W and a protection line switching unit 3P and surrounding units. The configuration of the network apparatus is the same as that illustrated in FIG. 1.

Referring to FIG. 4, the working line switching unit 3W and the protection line switching unit 3P have the same configuration, and the line switching units 3W and 3P each include a control signal generation unit 31 and a main signal processing unit 32.

The control signal generation unit 31 includes a memory 311, a control signal processing unit 312, a memory error detection processing unit 313, and a control signal termination processing unit 314. The main signal processing unit 32 includes a cross-connection processing unit 321, and the cross-connection processing unit 321 includes a buffer 322. The interface unit 4 includes a selector 41.

The memory 311 of the control signal generation unit 31 stores the switching control information set by the CPU 5 and intermediate information. The control signal processing unit 312 generates a line switching control signal based on the information stored in the memory 311. When the data is stored in the memory 311, information (parity information) for error detection is added to the data. The memory error detection processing unit 313 checks the read data based on the parity information, and notifies the CPU 5 of error information upon detection of a memory error as the result of the check.

The control signal termination processing unit 314 transmits the line switching control signal from the control signal processing unit 312 and the error information from the memory error detection processing unit 313 to the main signal processing unit 32 at substantially the same time, after timing adjustment.

The main signal processing unit 32, based on the line switching control signal and the error information input from the control signal termination processing unit 314 of the control signal generation unit 31, stores the information (switching control information and intermediate information) contained in the line switching control signal in the buffer 322 if the error information does not indicate a memory error. On the other hand, if the error information indicates a memory error, the main signal processing unit 32 stops storing the information contained in the line switching control signal in the buffer 322. At this time, the buffer 322 holds the previous information.

The cross-connection processing unit 321 performs the line switching control of a main signal based on the information contained in the line switching control signal stored in the buffer 322. The selector 41 of the selector 41 normally selects the output of the main signal processing unit 32 of the working line switching unit 3W, and transfers the output to, for example, a subsequent processing circuit in the interface unit 4.

When the CPU 5 receives the error information indicating the occurrence of an error from the control signal generation unit 31 of the working line switching unit 3W, the CPU 5 changes the selection from the output of the working line switching unit 3W over to the output of the protection line switching unit 3P by controlling the selector 41 of the interface unit 4.

At this time, for a few seconds until the changeover is completed, transmission data from the working line switching unit 3W where an error has occurred in the memory 311 passes through the selector 41 of the interface unit 4. However, the cross-connection processing unit 321 holds the previous state since the updating of the buffer 322 has been stopped based on the error information indicating an error, and hence, cross-connection processing is performed based on the information contained in the normal line switching control signal before the occurrence of a memory error. Consequently, incorrect transmission of information of an unexpected different line may be avoided.

Figure 5:
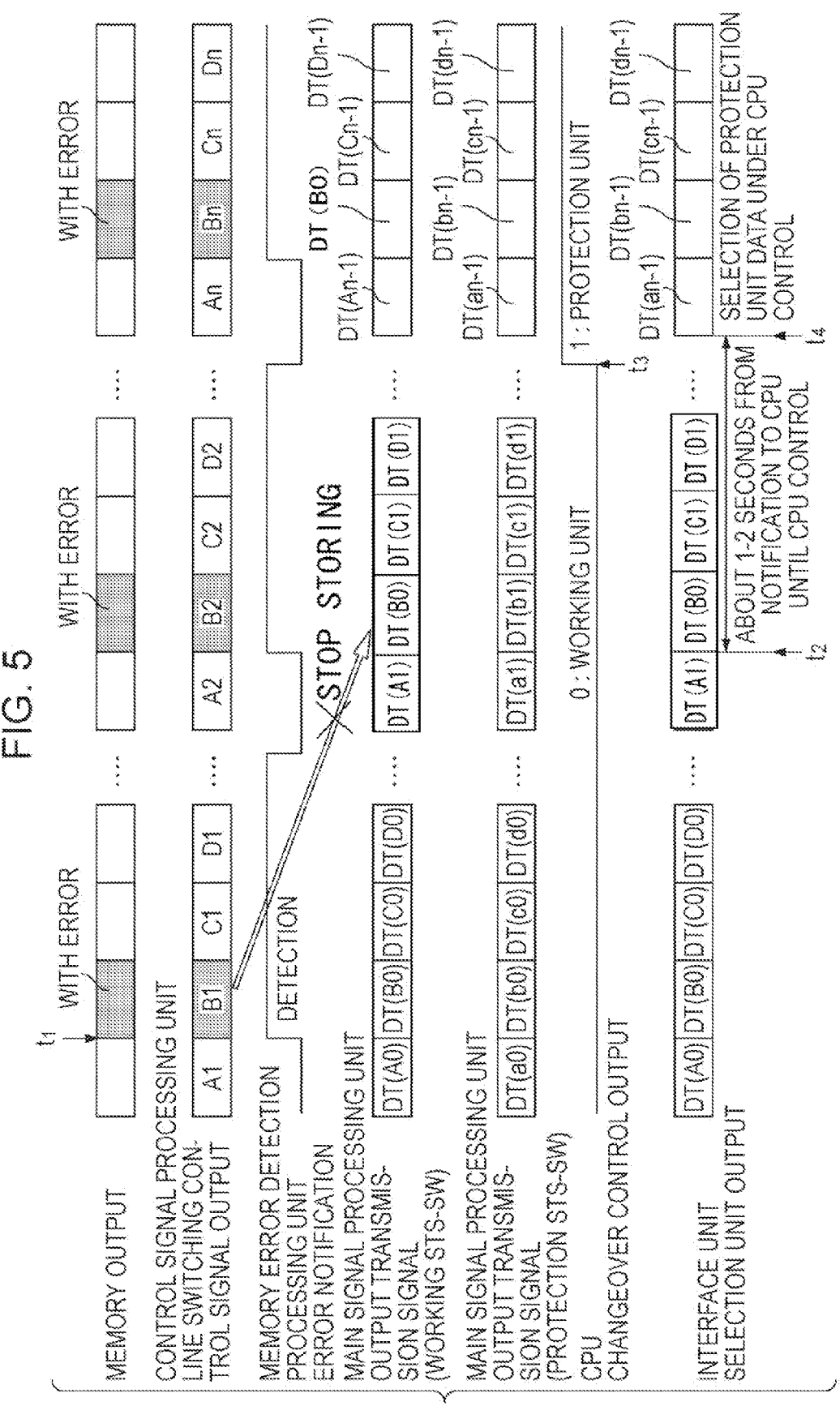
FIG. 5 is a time chart illustrating exemplary processing performed at the time of the occurrence of a memory error in the first embodiment.

FIG. 5 is a time chart illustrating exemplary processing performed at the time of the occurrence of a memory error. FIG. 5 illustrates the changes in the states of the following from the top in FIG. 5: the output of the memory 311, the line switching control signal output of the control signal processing unit 312, the error notification given by the memory error detection processing unit 313, the output transmission signal of the main signal processing unit 32 of the working line switching unit 3W, the output transmission signal of the main signal processing unit 32 of the protection line switching unit 3P, the changeover control output of the CPU 5, and the output of the selector 41 of the output interface unit 4.

Referring to FIG. 5, it is assumed that a memory error has occurred at time t1 in data in the memory 311 corresponding to the second channel of a frame. Then the memory error detection processing unit 313 notifies the CPU 5 of the occurrence of the error at almost the same time. The control signal processing unit 312 outputs a line switching control signal based on the data including the memory error. Note that the memory error is similarly detected in the subsequent frames, since the data in the memory 311 is not updated until a new value is set by the CPU 5.

Since the error information received from the control signal termination processing unit 314 of the control signal generation unit 31 indicates a memory error, the main signal processing unit 32 stops storing (importing) the information contained in the line switching control signal in the buffer 322, and holds the previous state. When the main signal processing unit 32 performs processing one frame after the receipt of the line switching control signal, the cross-connection processing is performed based on the information contained in the normal line switching control signal before the occurrence of an error. Hence, cross-connection processing for an unexpected different line may be avoided.

The CPU 5 starts the control of changeover to the protection unit at time t2 concurrently with the processing in the main signal processing unit 32 one frame after the receipt of the line switching control signal. At time t3, the CPU 5 transmits a changeover control output to the interface unit 4, and the interface unit 4 selects the output transmission signal of the protection line switching unit 3P from time t4.

Hence, during a time period of about one to two seconds required for the completion of changeover to the protection unit, the interface unit 4 passes transmission signals from the working line switching unit 3W where a memory error has occurred. However, since the working line switching unit 3W performs the cross-connection operation based on the information contained in the normal line switching control signal prior to the occurrence of the memory error, incorrect transmission of information of an unexpected different line may be avoided.

In the first embodiment described above, an example is illustrated in which the control signal termination processing unit 314 is included in the control signal generation unit 31; however, the control signal termination processing unit 314 may be configured to be included in the main signal processing unit 32. In addition, the control signal termination processing unit 314 may by placed between the control signal generation unit 31 and the main signal processing unit 32. The control signal termination processing unit 314 of the first embodiment performs control so that the cross-connection operation is not performed based on the information contained in the line switching control signal corresponding to the occurrence of an error, by transferring the error information and line switching control signal to the cross-connection processing unit 321.

An alternative method may be performed by controlling the control signal termination processing unit 314 to not transfer the line switching control signal corresponding to an error to the cross-connection processing unit 321, based on the generation of error information.

This alternative method works similarly and has a similar effect.

Second Embodiment

In a second embodiment, memory error information is generated for individual channels, the channels being in units of line switching, and only information contained in a line switching control signal corresponding to that memory information is not imported into a main signal processing unit, thereby realizing the efficient use of the lines.

In other words, in the first embodiment described above, when a memory error is detected in a certain channel, information regarding other channels contained in the line switching control signal is also stopped from being imported into the main signal processing unit, irrespective of whether or not the channel is being used. This may cause a decrease in efficiency of utilization.

In the second embodiment, channels in which a memory error has not been detected are continued to be used, thereby realizing efficient use of the line.

The apparatus configuration looks similar to that illustrated in FIG. 4. However, the functions of a memory error detection processing unit 313 and a cross-connection processing unit 321 are different.

In other words, in the present embodiment, the memory error detection processing unit 313 has a function of outputting error information indicating the occurrence of a failure for each channel concurrently with the timing of each channel in each frame of a line switching control signal generated through serial processing performed by a control signal processing unit 312 based on data stored in a memory 311.

The cross-connection processing unit 321 has a function of either storing or stopping storing the information contained in the line switching control signal in a buffer 322 individually for each channel, based on the line switching control signal and error information received from a control signal termination processing unit 314.

Figure 6:
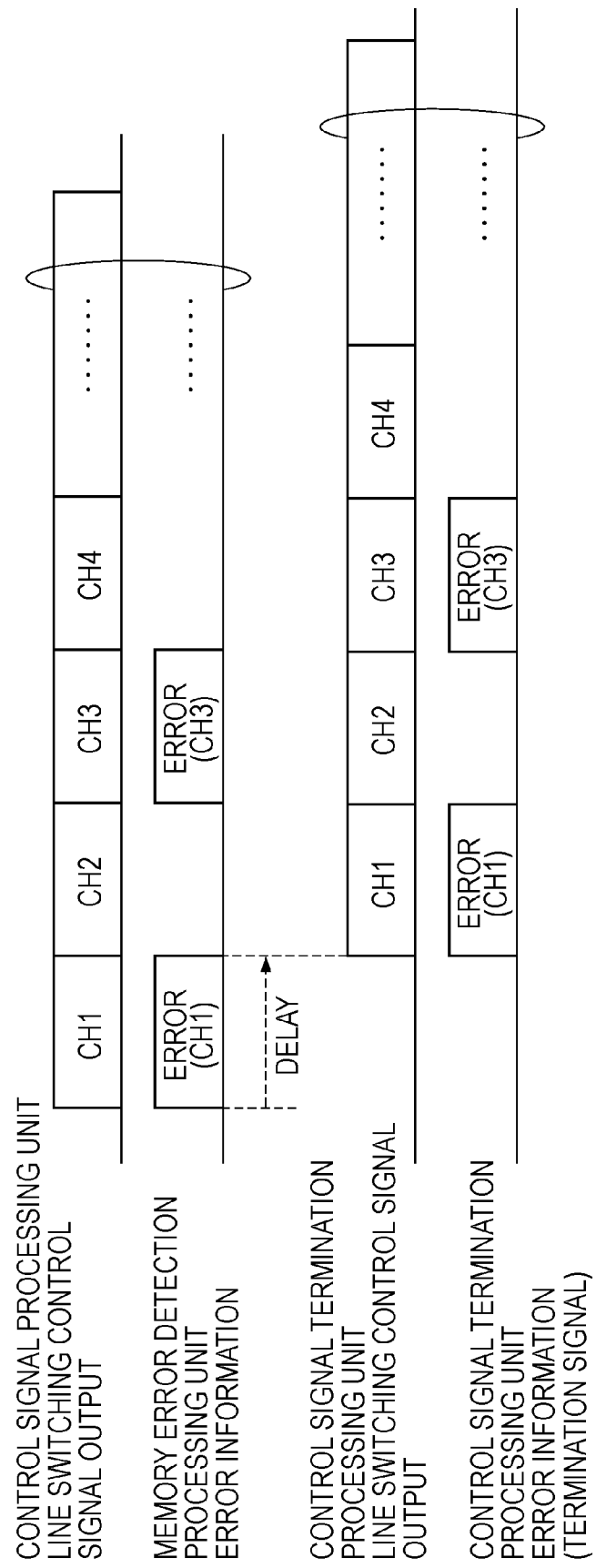
FIG. 6 is a time chart illustrating an example of the phase relationship between a line switching control signal and error information in a second embodiment.

FIG. 6 is a time chart illustrating an example of the phase relationship between the line switching control signal and the error information. FIG. 6 illustrates the respective changes in the states of the line switching control signal output of the control signal processing unit 312, the error information of the memory error detection processing unit 313, the line switching control signal output of the control signal termination processing unit 314, and the error information (termination signal) of the control signal termination processing unit 314.

It is assumed here that memory errors have occurred in channels CH1 and CH3. Then the memory error detection processing unit 313 outputs error information indicating the occurrence of memory errors to the control signal termination processing unit 314 concurrently with the respective timings of the channels CH1 and CH3 of the line switching control signal of the control signal processing unit 312. In other words, the line switching control signal and the error information are output with substantially the same phase. The control signal termination processing unit 314 outputs the line switching control signal and the error information with substantially the same phase with a delay corresponding to the control signal termination processing.

The cross-connection processing unit 321, upon receipt of the line switching control signal and the error information from the control signal termination processing unit 314, stores, in the buffer 322, the information contained in the line switching control signal about channels for which the error information does not indicate the occurrence of an error. On the other hand, the cross-connection processing unit 321 stops storing, in the buffer 322, the information contained in the line switching control signal about channels for which the error information indicates the occurrence of a memory error Hence, the previous information is held in the case of information contained in a line switching control signal corresponding to channels in which memory errors have occurred, and the latest information contained in a normal line switching control signal is stored in the buffer in the case of information contained in a line switching control signal corresponding to channels in which a memory error has not occurred. This avoids cross-connection processing for an unexpected channel based on information corresponding to the detection of a memory error. In addition, this allows cross-connection processing based on the latest information for channels for which a memory error has not been detected, thereby realizing efficient use of the line.

Further, since the memory error detection processing unit 313 notifies a CPU 5 of error information for each channel, the CPU 5 may determine the locations of errors, thereby realizing enhanced maintainability of SONET/SDH systems or the like.

In other words, when control for each channel is performed independently by hardware, inability to determine which channel has a memory error may cause the manageability to be lowered. However, by making the CPU 5 recognize error information for each channel as in the present embodiment, the number of locations within the memory 311 to be checked is reduced and maintainability is enhanced. Notification of error information individually for each channel may be implemented by providing registers in the memory error detection processing unit 313 for storing error information for each channel, and by making the register be periodically read by the CPU 5.

Third Embodiment

A third embodiment is configured so as to be widely applicable to interface cards and applications supporting concatenation formats such as STS-3c, 12c, 48c, 192c, and 768c. "Concatenation" indicates that a plurality of channels, which are the smallest units of a data frame, such as STS-1 in SONET, are concatenated so as to be used as one channel. The concatenated plurality of channels makes up a concatenation group.

In the second embodiment described above, the main signal processing unit is controlled to stop reception of a line switching control signal and to hold the previous content in the buffer individually for each channel where a memory error has occurred.

Here, when the channel in which a memory error has occurred corresponds to part of a concatenation group, in the concatenation group to be processed as one entity, there exist two kinds of channels: one with line switching information that is to be updated and the other with line switching information that is not to be updated, causing mismatching in the concatenation group.

Hence, in the present embodiment, memory error information is handled on a group-by-group basis. In other words, the above-described problem is addressed by stopping the storing, in the buffer, of information contained in the line switching control signal corresponding to a concatenation group that includes the channel in which a memory error has occurred.

Figure 7:
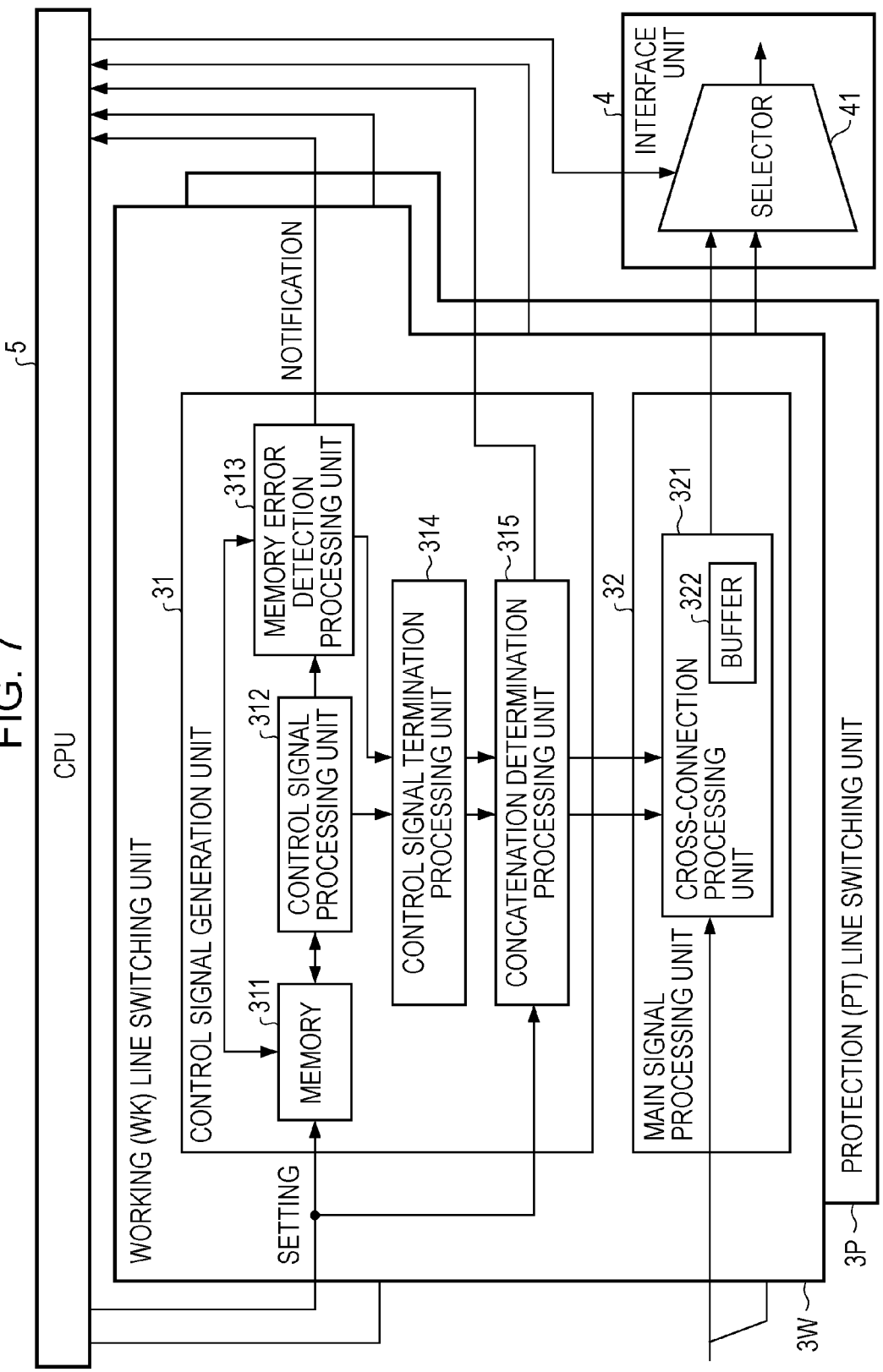
FIG. 7 is a block diagram illustrating an exemplary configuration of a network apparatus according to a third embodiment.

FIG. 7 is a block diagram illustrating an exemplary configuration of a network apparatus according to a third embodiment and illustrates the configurations of a working line switching unit 3W and a protection line switching unit 3P and surrounding units. The configuration of the network apparatus is the same as that illustrated in FIG. 1.

Referring to FIG. 7, a newly added configuration component compared with FIG. 4 is a concatenation determination processing unit 315, with the other configuration and functions being the same as in FIG. 4. Concatenation information is set in the concatenation determination processing unit 315 by a CPU 5. The concatenation determination processing unit 315 receives, as inputs, the line switching control signal output from a control signal termination processing unit 314 and error information. The concatenation determination processing unit 315 has a function of converting error information on a channel-by-channel basis into error information on a concatenation group by concatenation group basis and outputting the error information while keeping the timing with the line switching control signal.

Figure 8:
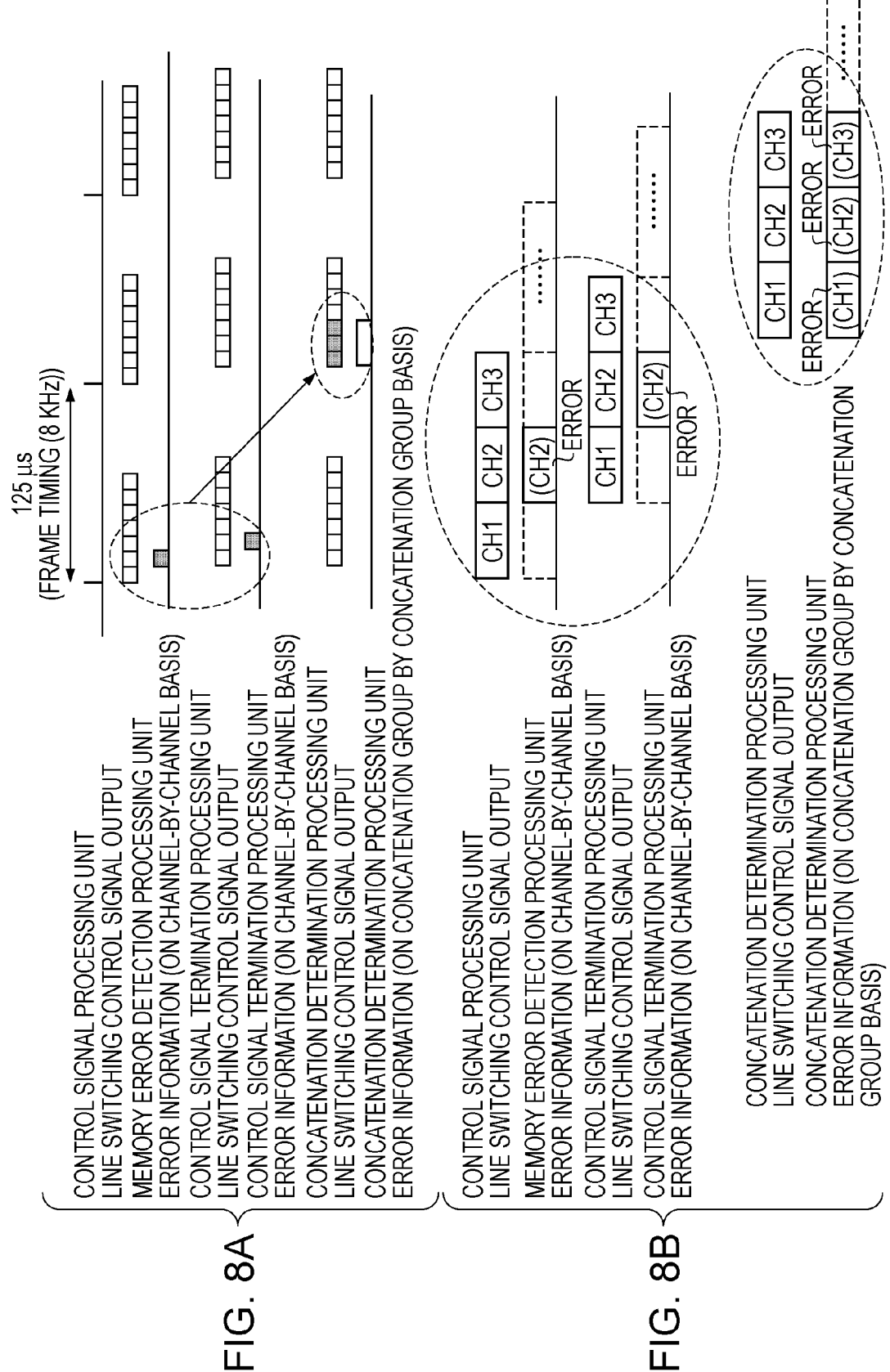
FIGS. 8A and 8B are time charts illustrating an example of the phase relationship between a line switching control signal and error information in the third embodiment.

FIGS. 8A and 8B are time charts illustrating an example of the phase relationship between the line switching control signal and the memory error information. More specifically, FIGS. 8A and 8B illustrate examples of: the line switching control signal of the control signal processing unit 312, the error information (on a channel-by-channel basis) of the memory error detection processing unit 313, the line switching control signal of the control signal termination processing unit 314, the error information (on a channel-by-channel basis) of the control signal termination processing unit 314, the line switching control signal of the concatenation determination processing unit 315, and the error information (on a concatenation group by concatenation group basis) of the concatenation determination processing unit 315. FIG. 8A illustrates a plurality of frames, and FIG. 8B is a magnified view of the portions surrounded by dotted lines illustrated in FIG. 8A.

In this example, it is assumed that the first to third channels CH1 to CH3 make up a concatenation group in accordance with STS-3C, and a memory error has occurred in the second channel CH2. In this case, as illustrated in FIG. 8B, the error information of the memory error detection processing unit 313 and the error information of the control signal termination processing unit 314 are output at respective timings corresponding to the channel CH2 in which a memory error has occurred. The concatenation determination processing unit 315 recognizes the concatenation group and outputs error information after converting the error information so as to allow indication of a memory error over all the channels CH1 to CH3 which make up the concatenation group including the channel CH2.

Accordingly, the cross-connection processing unit 321 stops the updating of a buffer 322 and holds the previous content not only for the channel CH2 in which a memory error has occurred but also for all the channels CH1 to CH3 making up a concatenation group. In this manner, generation of mismatching in the line switching control of the channels within the same concatenation group may be avoided.

Further, the memory error detection processing unit 313 notifies the CPU 5 of error information for each channel, and in addition, the concatenation determination processing unit 315 notifies the CPU 5 of error information for each concatenation group. This allows the CPU 5 to determine the error locations, thereby realizing enhanced maintainability of SONET/SDH systems or the like.

In other words, by making the CPU 5 recognize error information for each channel and each concatenation group, locations within the memory 311 to be checked are narrowed down and maintainability is enhanced. Notification of error information for each concatenation group may be implemented by providing registers in the concatenation determination processing unit 315 for storing error information for each concatenation group, and by allowing the registers to be periodically read by the CPU 5.

Fourth Embodiment

Figure 9:
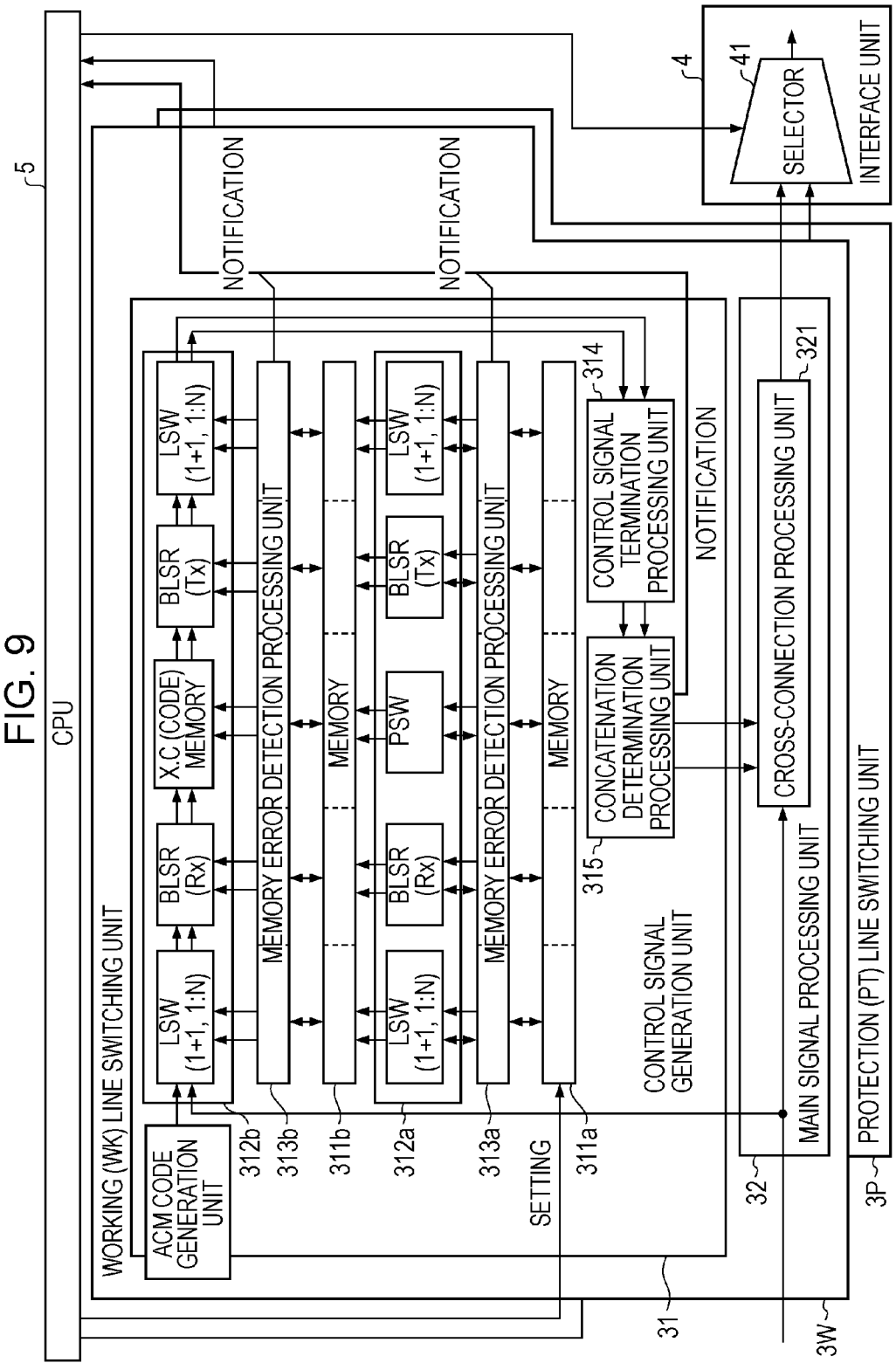
FIG. 9 is a block diagram illustrating an exemplary configuration of a network apparatus according to a fourth embodiment.

FIG. 9 is a block diagram illustrating an exemplary configuration of a network apparatus according to a fourth embodiment. FIG. 9 illustrates the configurations of the working line switching unit 3W, the protection line switching unit 3P, and surrounding portions. The present embodiment describes the configuration of the third embodiment in more detail.

Referring to FIG. 9, the working line switching unit 3W and the protection line switching unit 3P have the same configuration, and each include the control signal generation unit 31 and the main signal processing unit 32.

Referring again to FIG. 9, the control signal generation unit 31 includes the memory 311, the control signal processing unit 312, the memory error detection processing unit 313, the control signal termination processing unit 314, and the concatenation determination processing unit 315. The memory 311, the control signal processing unit 312, and the concatenation determination processing unit 315 are each divided into front and rear stages. In the front stage, a memory 311a, a memory error detection processing unit 313a, and a control signal processing unit 312a are sequentially arranged, and in the rear stage, a memory 311b, a memory error detection processing unit 313b, and a control signal processing unit 312b are sequentially arranged. To perform processing for various applications, switching control information is set in the front stage memory 311a by the CPU 5, and the rear stage memory 311b stores intermediate information generated by the front stage control signal processing unit 312a. The control signal processing units 312a and 312b include reception (Rx) side and transmission (Tx) side line switching (LSW) blocks and reception (Rx) side and transmission (Tx) side bidirectional line switching ring (BLSR) blocks, corresponding to various applications.

Error information detected by the memory error detection processing unit 313a and error information detected by the memory error detection processing unit 313b is carried in parallel to the respective line switching control signals. The front stage error information is superimposed on the rear stage error information in the rear stage processing blocks, and the error information regarding the memories is gathered in the control signal termination processing unit 314. The CPU 5 is informed of the error information by a notification register within the memory error detection processing units 313a and 313b.

Figure 10:
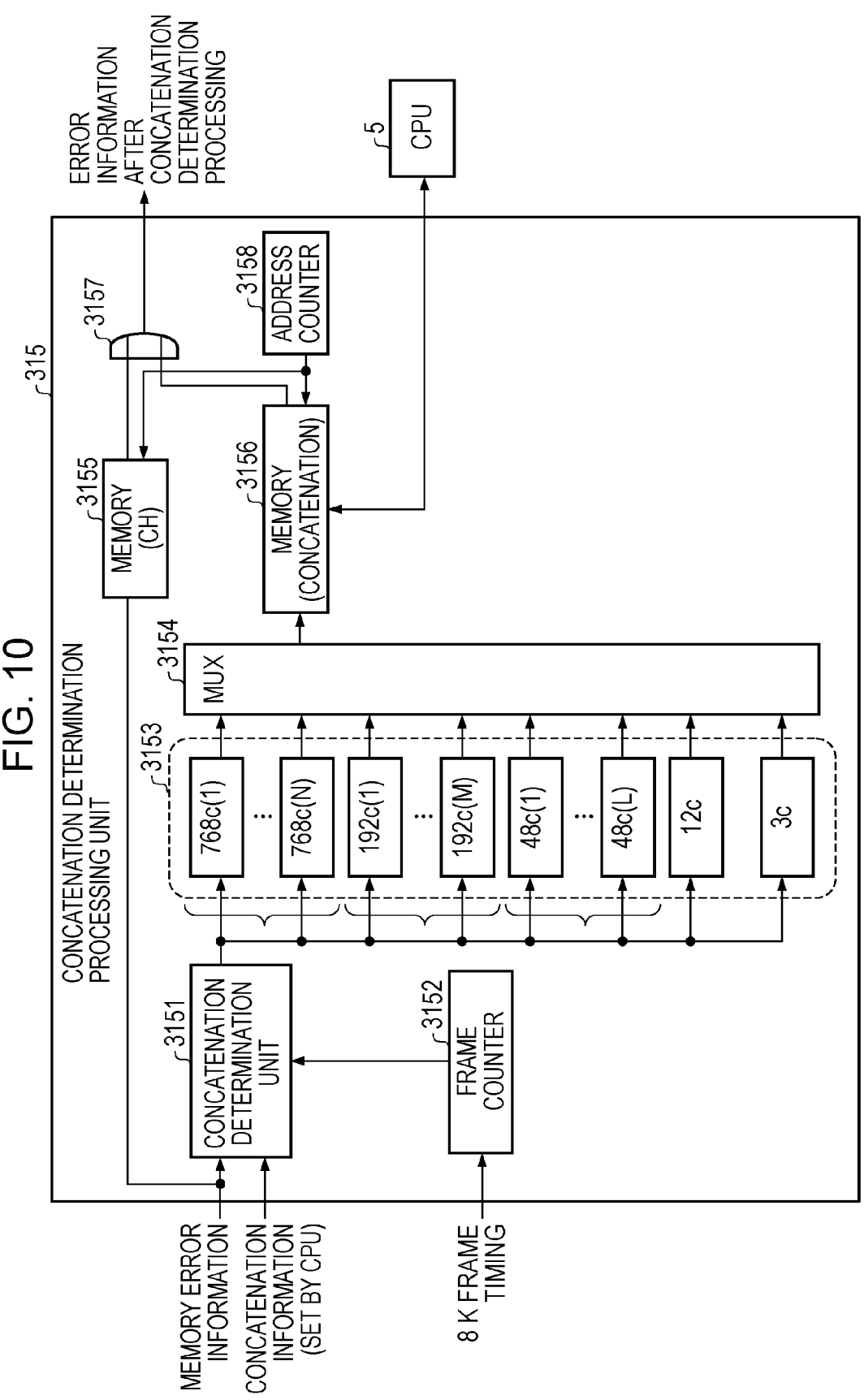
FIG. 10 is a block diagram illustrating an exemplary configuration of a concatenation determination processing unit.

FIG. 10 is a block diagram illustrating an exemplary configuration of the concatenation determination processing unit 315. Referring to FIG. 10, the concatenation determination processing unit 315 includes a concatenation determination unit 3151, a frame counter 3152, a memory 3153, a multiplexer 3154, a memory 3155, a memory 3156, an OR gate 3157, and an address counter 3158.

The concatenation determination unit 3151 expands the error information in units of STS-3c/12c/48c/192c/768c, based on the concatenation information set by the CPU 5, and stores the determination results in the memory 3153.

Then, the error information, after being multiplexed in a respective concatenation group by the multiplexer 3154, is stored in the memory 3156 for concatenation. On the other hand, the error information input from the control signal termination processing unit 314 is stored in the memory 3155.

The error information on a channel-by-channel basis and the error information on a concatenation group by concatenation group basis are multiplexed by the OR gate 3157, and are output as a cross-connection termination signal. In addition, the error information on a concatenation group by concatenation group basis is sent to the CPU 5 from the memory 3156.

Figure 11:
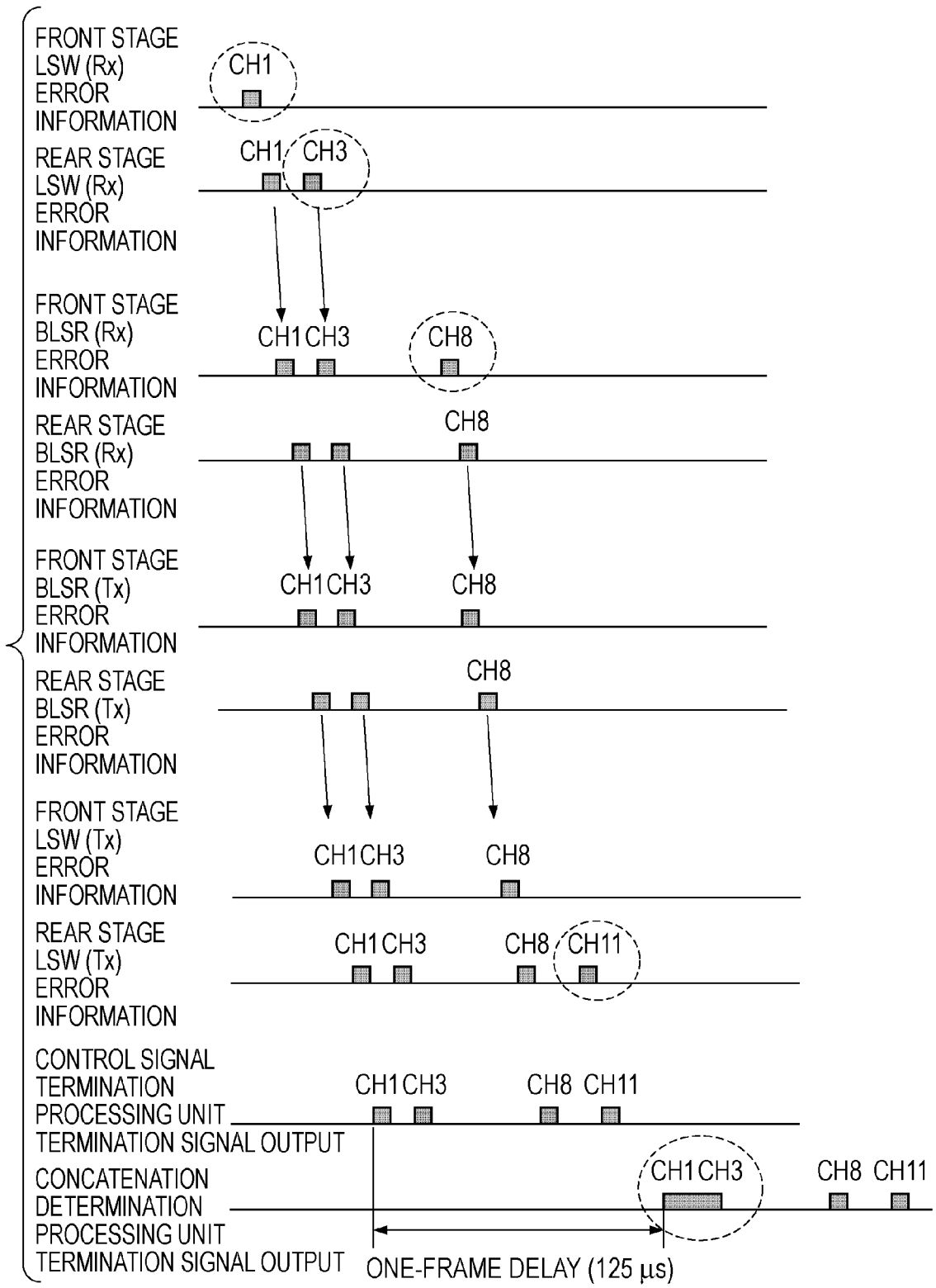
FIG. 11 is a time chart illustrating exemplary error information in the fourth embodiment.

FIG. 11 is a time chart illustrating exemplary error information. FIG. 11 illustrates error information output from the respective blocks of the control signal processing units 312a and 312b, error information output from the control signal termination processing unit 314, and error information output from the concatenation determination processing unit 315. It is assumed in the example illustrated in FIG. 11 that concatenation format STS-3c has been set, and memory errors have occurred in channels CH1, CH3, CH8, and CH11.

Referring to FIG. 11, when a memory error of CH1 is detected in the front stage LSW (Rx), the error information is carried over to the rear stage LSW (Rx), where the error information of the channel CH3, in which a new memory error has been detected, is superimposed. This error information is carried over to the front stage BLSR(Rx), where the error information of the channel CH8, in which a new memory error has been detected, is superimposed. This error information is sequentially carried over to the rear stage BLSR (Rx), front stage BLSR (Tx), rear stage BLSR (Tx), front stage LSW (Tx), and rear stage LSW (Tx), where the error information of the channel CH11, in which a new memory error has been detected, is superimposed. The control signal termination processing unit 314 outputs the gathered error information on a channel-by-channel basis based on the error information of the rear stage LSW (Tx).

Based on the STS-3C concatenation format, the concatenation determination processing unit 315, with a delay of one frame, converts error information of channels CH1 and CH3 in which memory errors have been detected into error information of channels CH1 to CH3, which make up a concatenation group. Error information of other channels is output as is.

According to the plurality of embodiments described above, the following advantages are provided:
(1) Despite recent increasing soft errors, by providing the function of stopping the updating of a line switching control signal, changeover from a working unit to a protection unit without generation of line misconnection becomes possible, whereby increased line quality is expected.
(2) By providing the function of detecting an error and stopping the updating of a line switching control signal on a channel-by-channel basis, and by stopping the updating of only channels in which a memory error has been detected and continuing to use channels in which an error has not been detected, efficient usage of lines is expected.
(3) Since detection of errors and stopping of cross-connection processing on a concatenation group by concatenation group basis is possible, the present invention may be applied to various interface cards and applications corresponding to STS-3c, 12c, 48c, 192c, or the like.
(4) Notification of memory error information on a channel-by-channel basis or on a concatenation group by concatenation group basis allows the locations of errors to be determined, whereby maintainability of SONET/SDH systems or the like is enhanced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A network apparatus comprising:
an input interface unit operable to receive and process a signal input from another apparatus;
a first line switching unit and a second line switching unit operable to cross-connect output signals from the input interface unit on a frame-by-frame basis;
an output interface unit which includes a selection unit operable to select either of outputs from the first and the second line switching units and which processes and outputs an output of the selection unit to another apparatus; and
a CPU operable to control the selection unit,
wherein the line switching units each include:
 a control signal generation unit operable to store setting data from the CPU in a memory and generate a line switching control signal based on the setting data stored in the memory;
 a memory error detection processing unit operable to detect a memory error of the memory and output error information regarding the memory error; and
 a main signal processing unit which writes setting data indicated by the line switching control signal into a buffer when the error information does not indicate an error, and holds previously-stored setting data in the buffer when the error information indicates an error, and which performs cross-connection processing based on the setting data stored in the buffer,
wherein the CPU controls the selection unit based on the error information, and
wherein both the error information and the switching control signal are provided to the main signal processing unit.

2. A network apparatus comprising:
an input interface unit operable to receive and process a signal input from another apparatus;
a first line switching unit and a second line switching unit operable to cross-connect output signals from the input interface unit on a frame-by-frame basis;
an output interface unit which includes a selection unit operable to select either of outputs from the first and the second line switching units and which processes and outputs an output of the selection unit to another apparatus; and
a CPU operable to control the selection unit,
wherein the line switching units each include:
 a control signal generation unit operable to store setting data from the CPU in a memory and generate a line switching control signal based on the setting data stored in the memory;
 a memory error detection processing unit operable to detect a memory error of the memory and output error information regarding the memory error; and
 a main signal processing unit which writes setting data indicated by the line switching control signal into a buffer when the error information does not indicate an error, and holds previously-stored setting data in the buffer when the error information indicates an error, and which performs cross-connection processing based on the setting data stored in the buffer, wherein the CPU controls the selection unit based on the error information, and wherein the control signal generation unit includes a control signal termination processing unit which generates the error information on a channel-by-channel basis, and outputs the error information to the main signal processing unit at substantially the same time as the line switching control signal.

3. The network apparatus according to claim 2, a concatenation group includes a concatenated plurality of channels, and wherein the line switching units each further include a concatenation determination unit which outputs, as the error information, error-indicating information regarding a channel within the concatenation group in which a memory error has been detected.

4. The network apparatus according to claim 3, wherein the concatenation determination processing unit notifies the CPU of a concatenation group in which a memory error has occurred.

* * * * *